March 17, 1959 — A. W. CHESTERMAN — 2,878,387
BEAM CONTROL PROBE
Filed Sept. 10, 1956 — 3 Sheets-Sheet 1

INVENTOR.
ALFRED W. CHESTERMAN
BY
Roland A. Anderson
ATTORNEY.

March 17, 1959 A. W. CHESTERMAN 2,878,387
BEAM CONTROL PROBE
Filed Sept. 10, 1956 3 Sheets-Sheet 2

INVENTOR.
ALFRED W. CHESTERMAN
BY
ATTORNEY.

March 17, 1959 A. W. CHESTERMAN 2,878,387
BEAM CONTROL PROBE
Filed Sept. 10, 1956 3 Sheets-Sheet 3

INVENTOR.
ALFRED W. CHESTERMAN
BY
ATTORNEY.

United States Patent Office 2,878,387
Patented Mar. 17, 1959

2,878,387

BEAM CONTROL PROBE

Alfred W. Chesterman, Livermore, Calif., assignor to the United States of America as represented by the United States Atomic Energy Commission Application September 10, 1956, Serial No. 609,046

8 Claims. (Cl. 250—41.9)

The present invention relates to a probe for intercepting a desired portion of a beam of charged particles and for indicating the spatial disposition of the beam.

In the control of charged particle apparatus, such as for example, charged particle accelerators, it is important to obtain information on exact beam location inasmuch as accelerating effects are normally nonuniform in space so that exact relationships are required to produce calculated results. Additionally it is important to know beam location for those operations involving beam utilization, such as beam interception.

The present invention provides a probe adapted to partially or entirely intercept a beam of charged particles traversing an evacuated space and being controllable from without the space. Although the probe may be employed with any charged particles including electrons, it is herein referenced for convenience to use with an ion beam.

It is an object of the present invention to provide an improved charged particle probe for intercepting a controllable fraction of a beam of charged particles.

It is another object of the present invention to provide a probe operable from without an evacuated chamber for movement into desired interception of a beam of charged particles within the chamber.

It is a further object of the present invention to provide remotely controlled beam interception means having opposed movable elements for indicating relative beam position.

It is yet another object of the present invention to provide remotely controlled means for determining the location and cross section of a beam of charged particles.

Numerous other possible objects and advantages of the present invention will become apparent to those skilled in the art from the following description of a single preferred embodiment of the invention taken together with the accompanying drawings, wherein.

Figure 1:
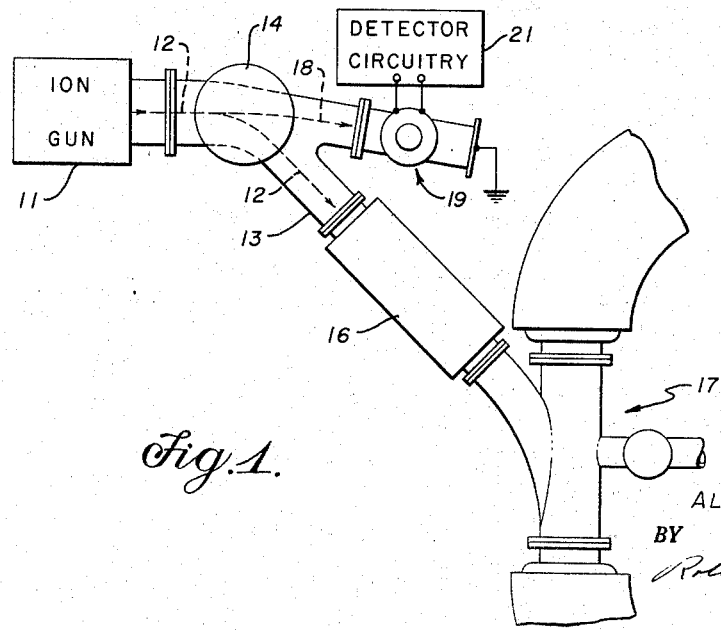
Figure 1 is a diagram of one probe application in a charge particle accelerator.

Considering first one preferred application of the invention and referring to Fig. 1, there is therein illustrated an injector for a particle accelerator and including an ion gun 11 producing a beam of ions 12 and directing same into a vacuum envelope 13 wherein magnetic field producing means 14 maintain a transverse magnetic field through which the ions travel. Ions of the beam 12 are deflected by the magnetic field, with the main portion of the beam being deflected to pass into a linear ion accelerator 16 wherein they achieve sufficient energy for injection into a particle accelerator 17, such as a bevatron, and shown only in part. In addition to the production of ions of a desired mass-to-charge ratio for accelerator injection, the ion gun 11 also produces some small quantity of ions of a known greater mass-to-charge ratio whereby same are deflected to a lesser degree by the magnetic field. These heavier ions thus travel from the magnet in a different path from the main beam to form an auxiliary beam 18 and the ion probe 19 of the present invention is disposed in the path of same by attachment to the envelope 13 for intercepting the auxiliary beam. It will be appreciated that with known ion mass-to-charge ratios, determination of the location of the auxiliary beam 18 provides precise information on the path of the main beam 12 and appropriate electrical detector circuitry 21 connected to the probe 19 indicates variation of the main beam from a desired path.

Figure 2:
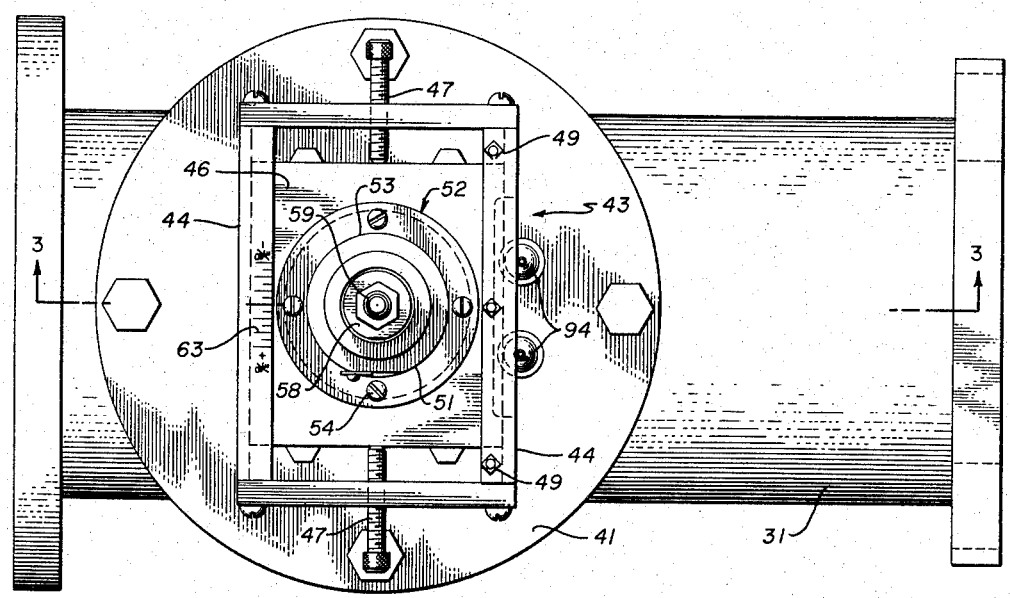
Figure 2 is a plan view of a preferred embodiment of the control probe of the present invention.
Figure 3:
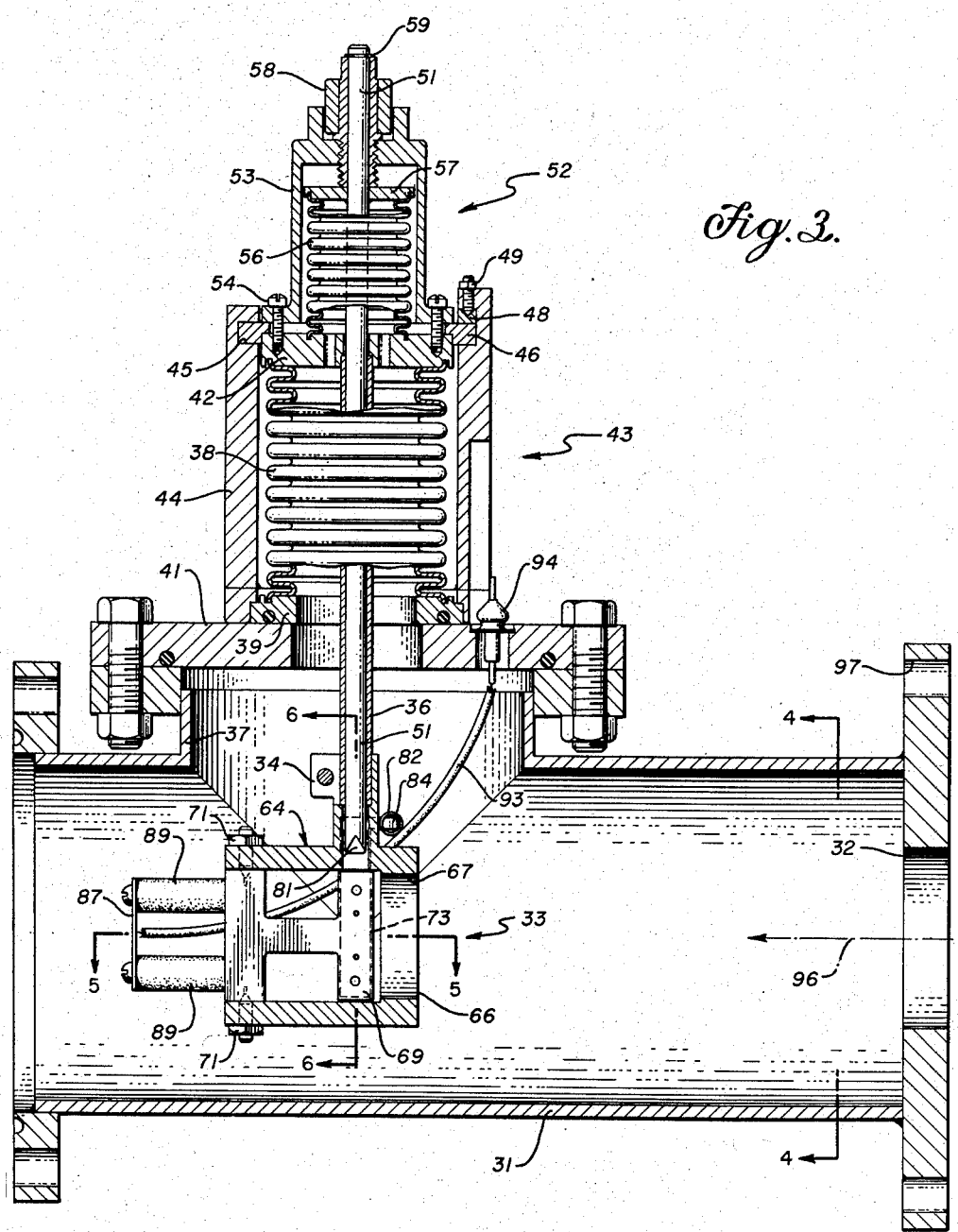
Figure 3 is a sectional view of the probe taken at 3—3 of Fig. 2.
Figure 4:
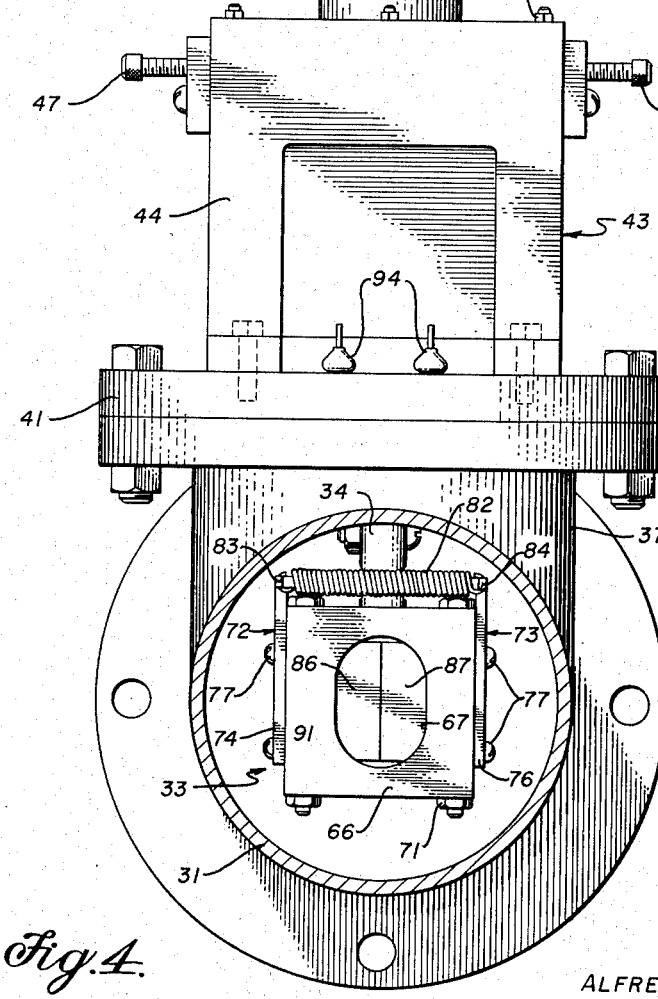
Figure 4 is a sectional view of the probe taken at 4—4 of Fig. 3.

Considering now the structural details of a preferred embodiment of the invention as illustrated in the drawings and referring to Figs. 2–4, there will be seen to be provided a cylindrical probe housing 31 having flanged ends for attachment to other equipment and one end wall defining a central beam entrance aperture 32. Within the housing 31 is disposed a probe assembly 33 defining atop same an integral clamp 34 adapted to removably engage a tubular depending support or stem 36. The housing 31 is additionally provided with a top opening 37 through which the probe stem 36 extends for attachment with position control means.

The interior of the probe housing 31 is adapted to be evacuated for ion beam traverse and thus vacuum sealing means are provided about the probe stem 36 in the form of a flexible bellows 38 about the stem with a bellows end plate 39 at the bottom thereof sealingly mounted upon a base plate 41 that is in turn secured as by bolts to a flange about the housing top opening 37. Suitable sealing means are provided about the above connections with a retainer ring 42 atop the bellows and secured about the probe stem which extends therethrough.

Probe stem movement and adjustment is provided by motion control means 43 including a rectangular guide bracket 44 about the bellows 38 and secured to the base plate 41 as by bolts. Horizontal slots 45 are formed in the inner facing surfaces of the guide bracket near the top thereof and extending transversely of the probe housing with a rectangular carriage plate 46 disposed in sliding relation within these slots. As seen in Fig. 2, the carriage plate 46 is shorter than the guide bracket 44 transversely of the probe housing so that the plate is movable within the slots in the guide and adjusting bolts 47 are threaded through the guide bracket at opposite ends thereof for bearing upon the carriage plate to move same in the slots 45. The carriage plate 46 has a central aperture therethrough with a shoulder thereabout engaging the bellows retainer ring 42 below same. There may be additionally provided in one of the guide bracket slots 45 a guide gib 48 atop the carriage plate and having one or more bolts 49 threaded through the guide bracket and pressing upon the gib from above, as seen in Fig. 3.

In addition to the transverse position control of the probe assembly afforded by the above-described elements, there is further provided control for fine transverse beam measurement and lateral beam cross section determination. In this respect, it is desired to impart a rotary or pivotal motion to certain probe assembly elements described below and this motion is imparted by means of a rod 51 disposed within the tubular probe stem 36 and extending from each end thereof. Controlled rod rotation is provided by a micrometer assembly 52 mounted atop the carriage plate 46 and including a vertical cylindrical housing 53 having a lower flanged end secured as by bolts 54 threaded into the lower bellows retainer ring 42 through the carriage plate aperture so as to bind together the retainer ring 42, carriage plate 46 and upper housing 53. Within the upper housing 53, there is disposed a small flexible bellows 56 about the rod 51 seated upon the lower bellows retainer ring 42 and closed at the upper end thereof by a disc 57 affixed to the rod 51 extending through same.

Movement of the probe rod 51 to accomplish the desired probe assembly adjustment is accomplished by the provision about the upper end of the rod of an elongated sleeve 58 affixed to the rod as by a clip 59 extending in threaded engagement through an aperture in the top of the cylindrical housing 53. The sleeve 58 slip fits the probe rod 51 so as to be readily rotatable thereon and rotation of the sleeve will be seen to advance or retreat same vertically in the top housing opening so that the sleeve and attached probe rod move vertically therein.

Figure 7:
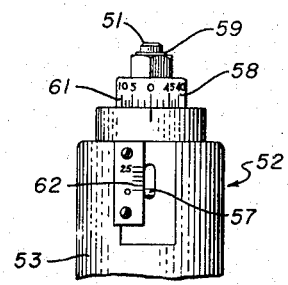
Figure 7 is a partial view of the probe showing the top thereof and rotated ninety degrees from the plane of Fig. 4.

Precise adjustment of the position control means is accomplished by suitable indicia provided and referenced to probe assembly elements. Thus a micrometer scale 61, Fig. 7, is formed on the sleeve 58 or upon a cylinder affixed thereabout within a well in the housing top with a reference mark on the housing registering therewith. A course scale 62 is provided along a vertically elongated aperture in the housing 53 and registering with the bellows disc 57. Lateral displacement of the probe assembly is indicated by a scale 63, Fig. 2, formed atop the guide bracket and registering with a mark on the upper housing 53.

Figure 5:
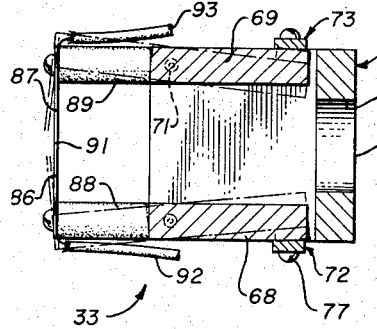
Figure 5 is a sectional view of a portion of the probe taken at 5—5 of Fig. 3.
Figure 6:
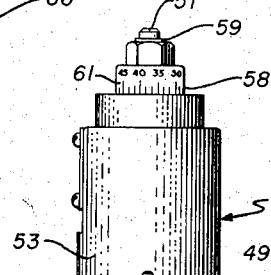
Figure 6 is a view of a portion of the probe taken at 6—6 of Fig. 3.
Figure 6:
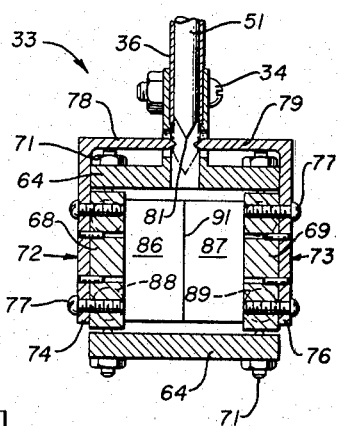

As regards the probe assembly 33, same will be seen from Figs. 3, 5, and 6 to include a rigid vane support element 64 having in general a U shape when viewed from the side, as in Fig. 3, with the U rotated 90 degrees so that the bottom forms a front wall 66 having a central beam entrance aperture 67 therethrough. Within the support element 64 are mounted two H-shaped pivot members 68 and 69 in parallelism between the top and bottom of the support member and extending rearward from the front wall 66. The pivot members are each mounted by means of a pair of pivot pins 71 extending through the support member 64 in alignement and having pointed ends extending into conical depressions at the top and bottom of the pivot members at the rear thereof. These pivot members are adapted to be pivoted about the rear pivotal mountings thereof by the rod 51 and to this end there are provided a pair of substantially mirror image control elements 72 and 73. These control elements 72 and 73 are mounted upon the pivot members 68 and 69, respectively, and they include vertical bars 74 and 76 secured as by bolts 77 to the lateral surfaces of the front vertical portion of the pivot members. The control elements 72 and 73 include arms 78 and 79, respectively, directed toward each other and having pointed ends in contact with opposite sides of the lower pointed end 81 of the rod 51. It will be seen that as the rod 51 moves vertically a greater or lesser rod thickness at the point 81 thereof is disposed between the control element arms 78 and 79 to pivotally position the pivot members 68 and 69. In order to maintain the control element arms in contact with the rod 51, a spring 82 is attached between stubs 83 and 84 extending at right angles to the bars and arms of the control elements 72 and 73, respectively, as seen in Figs. 3 and 4.

As a further portion of the probe assembly 33, there are provided a pair of flat vanes 86 and 87 mounted upon pairs of insulators 88 and 89, respectively, to the rear of the pivot members 68 and 69, respectively. The vanes will be seen to pivot with the pivot members as they are attached thereto, and in a closed vane position wherein the pivot members are aligned with the probe assembly and housing axes, the vanes lie in a single plane normal to and intercepting the beam path and contact along adjacent edges. The vanes pivot outward with pivoting of the pivot members to open a slit 91 therebetween for ion beam passage and it will be seen that the slit width is precisely controllable by the micrometer assembly 52. As it is contemplated that measurements shall be made of ion beam interception by the vanes 86 and 87, electrical leads 92 and 93 are connected thereto respectively with suitable lead through insulators 94 extending outside the housing 31 for connection to suitable detecting and measuring circuitry.

In résumé of the above-described embodiment of the present invention, it is noted that the probe assembly 33 is adapted for translation laterally of the housing 31 by means of the motion control means 43 including the movable carriage plate 46. Although it is contemplated that an ion beam 96 shall enter axially of the probe housing, it is not always possible to control the entrant beam with sufficient precision and thus the motion control means 43 provides for moving the probe assembly to properly intercept the entrant beam. Additionally, the flanged housing ends may be provided with vertically elongated bolt holes 97 so that the entire position of the housing is vertically adjustable for ion beam path deviations of a substantial magnitude.

With an ion beam directed through the probe assembly 33 and substantially coincident probe axis and beam path, the beam will strike the vanes 86 and 87 in the closed position thereof. As ion current to each vane is separately measurable an indication is thus obtainable as to ion beam location, i. e., if only one vane receives a current the beam path is displaced toward this vane. Further, by moving the rod 51 downward by the micrometer assembly 52 and pivoting the vanes outward through the control elements and pivot members the width of slit 91 is increased. Thus it is possible to determine from vane current readings the amount of displacement of the beam from the probe axis and further to determine the cross section of a centered beam.

What is claimed is:

1. A probe assembly adapted for disposition in the path of ion beam and including a pair of pivotally mounted vanes movable into a single plane with adjacent edges joining, control means for pivoting said vanes apart for precisely controlling vane separation, and indicating apparatus connected to each of said vanes for indicating ion beam current to separate vanes.

2. An ion probe comprising a probe assembly having a pair of pivotally mounted vanes defining a slit of controllably variable width therebetween, and translation means mounting said probe assembly for multidirectional translation to provide adjustable alignment with an ion beam.

3. An ion probe as defined in claim 2 further defined by said vanes comprising electrically conducting material and being insulated from each other and from other probe components, and electrical leads connected to separate vanes for attachment to indicating means showing ion beam current to separate vanes.

4. An ion probe comprising a housing, a probe assembly having movable electrically insulated metallic vanes, means mounting said assembly in said housing including a stem mounted for axial translation and engaging the assembly, motion control means including a carriage plate carrying said stem and controllably movable laterally thereof relative to said housing for positioning said assembly therein, and remote control means operating said carriage plate and stem for moving said assembly vanes from without said housing.

5. An ion probe as claimed in claim 4 further defined by said probe assembly having sides pivotally mounted in a vertical plane at the rear thereof and carrying said vanes upon insulators extending rearward from the assembly sides, and control elements separately connected to said pivotal assembly sides with spring loading drawing the leading edges of the sides together and engaging said stem for controlled movement thereby to control relative vane disposition.

6. An ion probe comprising a housing having open ends for beam traverse therethrough and an opening in a wall thereof, a bracket extending from said housing and carrying in slideable relation thereto a carriage plate, adjusting means for controlling the position of said carriage plate in said housing, a stem secured to said carriage plate and extending into said housing, sealing means including a flexible bellows about said stem for closing said housing opening, and a probe assembly including target vanes mounted for angular displacement about said stem within said housing whereby the position of said assembly is controllable within said housing.

7. An ion probe as claimed in claim 6 further defined by said stem having a movable core rod, control means engaging said stem exteriorly of said housing for axially displacing the rod thereof, and said assembly vanes being pivotally mounted for defining a controllably variable slit therebetween and joined to said stem rod for displacement by axial displacement thereof whereby relative vane disposition is controllable exteriorly of said housing.

8. A probe for accurately indicating the location and cross sectional intensity distribution of a beam of charged particles comprising a housing having an opening therethrough for charged particle beam traverse and adapted for adjustable connection to evacuated beam devices, a stem having a longitudinally movable core with a tapered inner end and disposed to extend through an opening in a side of said housing, a carriage plate mounting said stem and controllably movable laterally thereof exteriorly of said housing in sealing relation thereto, a threaded member engaging said stem core atop said carriage for controllably displacing said core longitudinally of said stem, a pair of electrically conducting vanes adapted for contiguous coplanar disposition traversely within said housing, a vane support element secured to said stem within said housing and having two pivotally mounted members secured to said vanes, a pair of control elements secured one to each of said pivotally mounted members and engaging the tapered core end of said stem whereby stem core displacement controls relative vane disposition as to separation thereof, and current measuring means connected to separate vanes for indicating electrical beam current to each.

References Cited in the file of this patent
UNITED STATES PATENTS

| | | |
|---|---|---|
| 2,292,087 | Ramo | Aug. 4, 1942 |
| 2,440,067 | Bensen | Apr. 20, 1948 |
| 2,486,452 | Washburn et al. | Nov. 1, 1949 |
| 2,626,359 | Weber | Oct. 16, 1951 |
| 2,674,698 | Danforth et al. | Apr. 6, 1954 |
| 2,709,222 | Lawrence | May 24, 1955 |